(12) United States Patent
Veltze

(10) Patent No.: US 6,181,422 B1
(45) Date of Patent: Jan. 30, 2001

(54) OPTICAL SURFACE MEASUREMENT APPARATUS AND METHODS

(75) Inventor: J. Andrew Veltze, London (GB)

(73) Assignee: Brown & Sharpe Limited, Telford (GB)

(*) Notice: Under 35 U.S.C. 154(b), the term of this patent shall be extended for 0 days.

(21) Appl. No.: 09/038,308

(22) Filed: Mar. 11, 1998

(30) Foreign Application Priority Data

Mar. 12, 1997 (GB) .................................................. 9705105

(51) Int. Cl.⁷ .................................................. G01B 11/30
(52) U.S. Cl. ...................... 356/371; 356/375; 369/44.24; 250/201.3; 250/201.5
(58) Field of Search .................................. 356/371, 375, 356/376; 250/201.1, 201.2, 201.3, 201.4, 201.5; 369/44.23, 44.24

(56) References Cited

U.S. PATENT DOCUMENTS

| | | | |
|---|---|---|---|
| 3,770,353 | 11/1973 | Brown et al. | 356/152 |
| 4,270,045 | 5/1981 | Opheij et al. | 250/204 |
| 4,656,348 | 4/1987 | Ando | 250/201 |
| 4,806,777 | 2/1989 | Ulbers et al. | 250/560 |
| 4,850,695 | 7/1989 | Mikuriva et al. | 356/237 |
| 4,888,476 | 12/1989 | Zucker | 250/201 |
| 4,917,498 | 4/1990 | Geary | 356/357 |
| 5,033,856 * | 7/1991 | Nose et al. | 250/201.2 |
| 5,161,139 | 11/1992 | Inoue et al. | 369/44.23 |
| 5,194,918 | 3/1993 | Kino et al. | 356/359 |
| 5,204,734 | 4/1993 | Cohen et al. | 356/359 |
| 5,532,987 | 7/1996 | Fujita et al. | 369/44.24 |

FOREIGN PATENT DOCUMENTS

| | | |
|---|---|---|
| 40 19 405 A1 | 12/1991 | (DE) . |
| 0 083 268 A1 | 7/1983 | (EP) . |
| 0 111 648 A1 | 6/1984 | (EP) . |
| 0 600 800 A1 | 6/1984 | (EP) . |
| 0 208 276 A1 | 1/1987 | (EP) . |
| 0 340 172 A1 | 11/1989 | (EP) . |
| 956 347 | 4/1964 | (GB) . |

(List continued on next page.)

OTHER PUBLICATIONS

"Principles of optical storage –2", Electronics and Wireless World, vol. 91, No. 1590, pp. 43–46 Apr., 1985.

Primary Examiner—Hoa Q. Pham
(74) Attorney, Agent, or Firm—Wolf, Greenfield & Sacks, P.C.

(57) ABSTRACT

An optical surface measurement device is disclosed. A beam of light is focused through an optical system into a spot on a sample and the optical system collects light reflected and scattered by the sample forming an image of the illuminated part of the sample on a focus detector. A control system responds to the focus detector moving the optical system to keep the spot in focus on the sample as the sample is tracked past the apparatus. The optical system may be moved as a whole or one of the lenses therein may be moved with respect to the others. Alternatively the movable lens may be set to oscillate and its position is recorded each time focus is achieved. The focus detector has two outputs one of which is larger than the other when the surface of the sample is above the plane focussed by the optical system and the other being larger when it is below. The control system uses both sum and difference signals calculated from those outputs to discriminate the point of focus. Other instruments are combined into the same optical system one of which is a camera which enables the measuring spot to be located on the sample. A beam splitting prism is used to divert light collected from the sample into the focus detector. In an alternative embodiment the light through the optical system on its way to the sample is caused to pass through separate parts of the optical components making up the optical system from those parts through which light is brought back to the focus detector from the sample.

21 Claims, 5 Drawing Sheets

FOREIGN PATENT DOCUMENTS

| | | |
|---|---|---|
| 982 091 | 2/1965 | (GB) . |
| 1 249 905 | 10/1971 | (GB) . |
| 1 355 472 | 6/1974 | (GB) . |
| 1 493 963 | 12/1977 | (GB) . |
| 1 536 496 | 12/1978 | (GB) . |
| 1 557 441 | 12/1979 | (GB) . |
| 2 111 196A | 6/1983 | (GB) . |
| 2 122 045 | 1/1984 | (GB) . |
| 2 158 228 | 5/1984 | (GB) . |
| 2 221 296 | 1/1990 | (GB) . |
| 06 241720 | 2/1994 | (JP) . |
| WO 88/02846 | 4/1988 | (WO) . |

* cited by examiner

OPTICAL SURFACE MEASUREMENT APPARATUS AND METHODS

The present invention relates to apparatus and methods for measuring the positions of points on sample surfaces. Those measurements may be used to calculate the numerical values of such characteristics as the flatness, form and roughness of the sample.

According to a first aspect of the invention there is provided an apparatus for measuring the position of a point on the surface of a sample comprising, means for producing a spot of light to illuminate said point on the surface of the sample, a focus detector, a focusing element system, comprising a movable focusing element and at least one other focusing element, arranged to project onto the focus detector an image of a plane beyond the focusing element system in the region of the sample surface, a focusing element system drive means for translating the focusing element system, a movable focusing element drive means for moving the movable focusing element within the focusing element system so as to vary the distance between the plane imaged on the focus detector and the focusing element system, a control means responsive to the focus detector for so operating the focusing element system drive and movable focusing element drive that an image of the illuminated point on the sample surface is kept in focus, or in a desired state of defocus, on the focus detector.

The focus element system drive may be arranged to move the focus element system mechanically and the movable focusing element drive may be arranged to move the movable focusing element electromagnetically.

The control means may be arranged to operate the movable focusing element drive in preference to the focusing element system drive to achieve focus.

The control means may be arranged to operate the focusing element system drive when the movable focus element drive approaches the end of its range.

The control means may be arranged to operate, when the movable focus element drive approaches the end of its range, the focusing element system drive further than is necessary to achieve focus and to operate the movable focusing element drive so that it moves back towards the centre of its range.

The movable focusing element drive may comprise a coil for producing a field for moving the movable focusing element and may comprise a driver circuit having a low output impedance.

The control means may be arranged, in response to the focus detector indicating that the apparatus is a long way from focus, to fix the position of the movable focusing element and to move the focusing element system with its drive towards the sample from a predetermined point until focus is achieved, having first withdrawn the focus element system if it is closer to the sample than the predetermined point.

According to a second aspect of the invention there is provided an apparatus for measuring the position of a point on the surface of a sample comprising, means for producing a spot of light to illuminate said point on the surface of the sample, a focus detector, a focusing element system, comprising a movable focusing element, arranged to project onto the focus detector an image of a plane beyond the focusing element system in the region of the sample surface, a movable focusing element drive means for so moving the movable focusing element as to vary the distance between the plane imaged on the focus detector and the focusing element system, a control means responsive to the focus detector for so operating the movable focusing element drive means that the position of the movable focusing element oscillates about the position at which an image of the illuminated point on the sample surface is in focus on the focus detector, the control means being arranged to record a measurement of the position of the movable focusing element at times when the image of the illuminated point is in focus on the focus detector.

The apparatus may comprise means for moving the spot across the sample and the control means may be arranged to keep the oscillation of the movable focusing element generally centred about the point of focus as the spot moves across the sample or the control means may be arranged to move the centre of the oscillation of the movable focusing element when the focus point approaches the end of the range of the oscillation. The control means may be arranged to control the frequency of oscillation to correspond to the desired spatial frequency of measurement points across the sample, or to a multiple thereof.

According to a third aspect of the invention there is provided an apparatus for measuring the position of a point on the surface of a sample comprising, means for producing a spot of light to illuminate said point on the surface of the sample, a focus detector comprising a transducer having at least two light sensitive areas, a focusing element system, comprising at least one focusing element, arranged to project onto the focus detector an image of a plane beyond the focusing element system in the region of the sample surface, the focus detector and the focusing element system being so arranged that a first one of the light sensitive areas receives more light when the illuminated spot is out of the said plane to one side and that a second one of the light sensitive areas receives more light when the illuminated spot is out of the said plane to the other side, a drive means for so moving the focusing element system, or one of its elements, as to vary the distance between the plane imaged on the focus detector and the focusing element system, signal generation means for adding signals from the said first and second light sensitive areas of the focus detector to provide a sum signal and comparing the level of the sum signal, or the level of a signal derived from the sum signal, with a threshold level for providing a gating signal indicating whether or not that sum is greater than the threshold, and also for providing a difference signal being the difference, or a function of the difference, of the signals from the said first and second light sensitive areas, and a control means responsive to the gating and difference signals controlling the drive means.

The said function of the difference signal may have the sum signal in its denominator.

The focus detector may comprise a first plurality of light sensitive areas that receive more light when the illuminated spot out of the said plane is to one side and a second plurality of light sensitive areas that receive more light when the illuminated spot is out of the said plane to the other side, the signals from the first plurality may be added together before being passed to the signal generation means and the signals from the second plurality may be added together before being passed to the signal generation means.

According to a fourth aspect of the invention there is provided an apparatus for measuring the position of a point on the surface of a sample and for imaging an area of the surface, the apparatus comprising, spot producing means for producing a spot of light to illuminate said point on the surface of the sample, an objective focusing element or system of focusing elements for collecting light reflected or scattered from said illuminated point and for collecting light from the area to be imaged, and a plate arranged to receive the light collected by the objective focusing element or system of focusing elements and orientated at an angle inclined to the direction of that light, the plate transmitting part of and reflecting part of that light, the apparatus further comprising sensing means sensitive to and arranged to receive light reflected from the plate.

The said plate may be such that it transmits a substantial portion of the collected light scattered or reflected from the illuminated point and reflects a substantial portion of a band of wavelengths other than that emitted by the spot producing means and to which the sensing means is sensitive.

The said plate may also reflect a portion of the collected light scattered or reflected from the illuminated point and the sensing means may also sensitive to that light.

The sensing means may be a camera.

The sensing means may be a receptor of an edge detector.

According to a fifth aspect of the present invention there is provided an apparatus for measuring the position of a point on the surface of a sample comprising, means for producing a spot of light to illuminate said point on the surface of the sample, a focus detector, a focusing element system, comprising at least one focusing element, arranged to project onto the focus detector an image of a plane beyond the focusing element system in the region of the sample surface, wherein the means for producing said spot of light projects said spot though the focusing element system, and wherein the apparatus is arranged such that light passing through the focusing element system on its way to producing the said spot is deflected by a first portion of the or each focusing element and that said focus detector receives light from said sample that has been deflected by a second portion, separate from the first, of the or each focusing element.

The apparatus may comprise a prism positioned so as to deflect the light deflected by said second portions into the focus detector and may be positioned so as not to be struck by light on its way to said spot.

In any of the above aspects of the invention the means for producing the spot of light on the surface of the sample may be arranged to project that spot through the focusing element system, and the source of light for that may be polarised and the apparatus may include a polarising beam splitter arranged to allow a major portion of the laser light to pass through undeflected on its way to the sample and to deflect light returning form the sample into the focus detector.

In any of the above aspects of the invention the means for producing a spot of light may comprise a linearly polarised source of light and the apparatus may comprise a quarter wave plate through which the light passes on its way from the source to the spot.

In any of the above aspects of the invention the apparatus may comprise an aperture set in front of the focus detector or around a focus lying between the spot on the sample and the focus detector.

In any of the above aspects of the invention the apparatus may have mounting means for translating and rotating a sample and the control means may be arranged to measure the shape or form of the sample.

In any of the above aspects of the invention the control means may be arranged to operate the mounting means to maintain the orientation of the sample such that the light from the means for producing the spot that is specularly reflected by the sample is received by the focus detector.

In any of the above aspects of the invention the movable focusing element may be mounted on at least one spring system, the or each spring system may comprise a plurality of arms arranged generally in a plane perpendicular to the axis of movement of the movable focusing element which support the movable focusing element, and the arms may be other than radial to the axis of movement, which may be spiral.

In any of the above aspects of the invention the apparatus may comprise a displacement sensor comprising, a tab of opaque material for mounting on the movable focusing element or on a co-moving support, a source of diffuse light placed to one side of the tab, and a transducer so placed that the source casts a shadow of the tab on the transducer, wherein the transducer has first and second separate light sensitive areas so placed that the shadow progressively covers more of the first area and less of the second as the tab moves in one direction.

In any of the above aspects of the invention the or a drive may be arranged to move the or a focus element or the focus element system mechanically or electromagnetically, and such an electromagnetic drive may comprise a coil for producing a field for moving the focusing element or focusing element system and may comprise a driver circuit having a low output impedance.

Any of the above aspects of the invention may be used in combination in a single apparatus.

In any of the above aspects of the invention the focusing elements may be and the focusing element systems may comprise lenses or mirrors.

One form of the invention will now be described in greater detail, by way of example only, and with reference to the accompanying drawings, of which:

Figure 1:
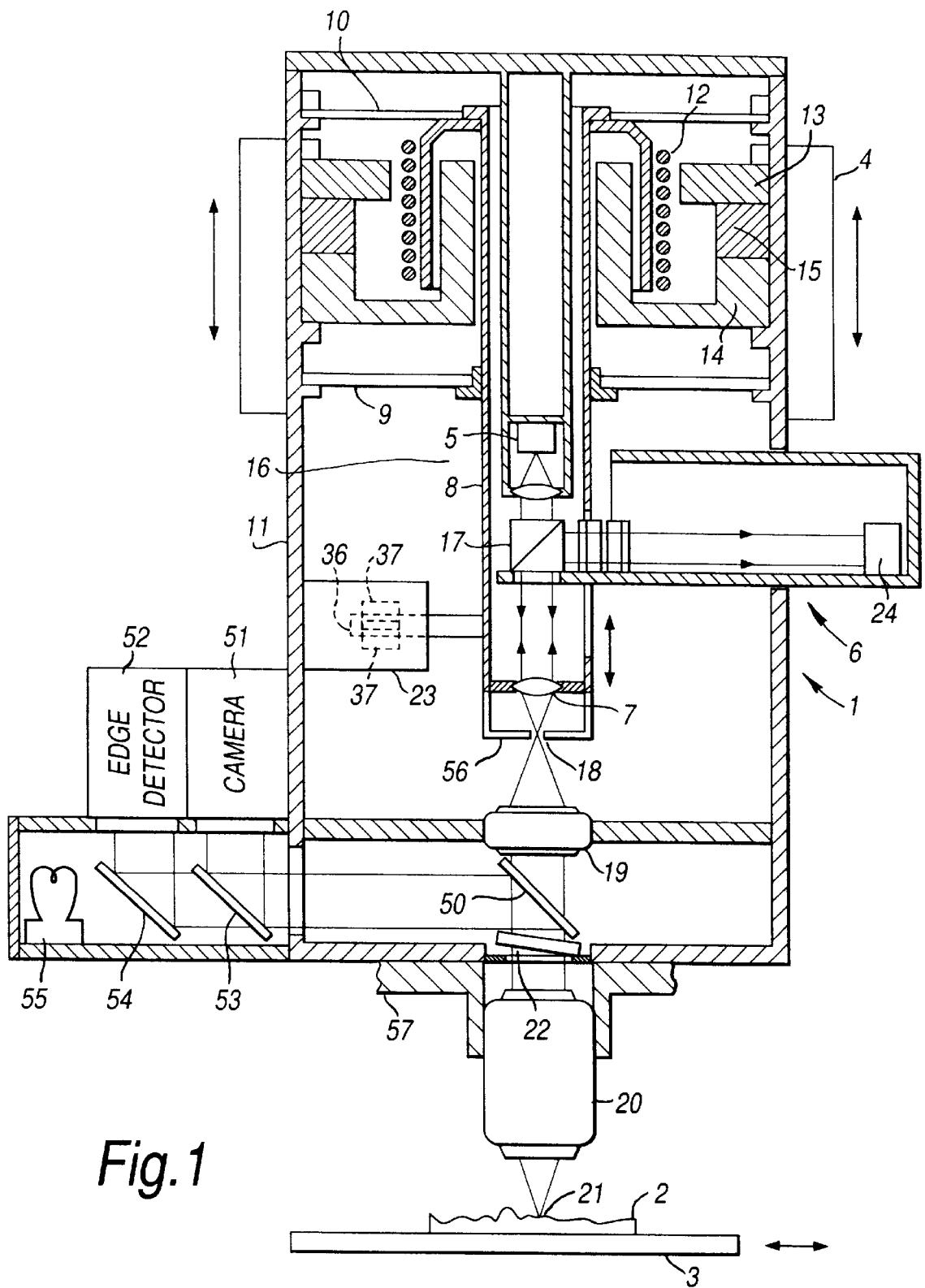
FIG. 1 shows a position measurement head.

FIG. 1 shows a position measurement head 1 and a sample 2 mounted on a table 3. For convenience and to avoid stressing a substantially planar sample the table is generally horizontal and the sample simply rests on the table; different arrangements will be appropriate for samples of other shape and configuration. The position measurement head is mounted in a mechanically driven support, of which only the mounting 4 for the measurement head 1 is shown in FIG. 1. The mechanical drive has a vertical travel of approximately 300 mm; a longer travel may be provided if necessary to accommodate the sample.

To reduce the effects of vibration, the position measurement head 1 and the table 3 are mounted on a massive stiff frame (not shown). That frame may be mounted on air springs to reduce the amount of vibration picked up by the frame from the floor on which it stands.

A system of lenses within the measurement head focuses the light from a laser 5 into a spot 21, which is on the surface of the sample 2 when a measurement of the position of the surface is being made. The laser light reflected from the surface returns through most of the lenses and is fed to a focus detector 6.

Laser 5 is a convenient source of a small intense spot of light. White light could be used instead of laser light. A source of white light that may be provided is that emitted at the end of an optic fibre which has a larger source of white light at its other end.

One of the lenses, a movable lens 7, is mounted to move along the optical path from the laser. The mounting 8 for the movable lens is suspended within the measurement head 1 by two spring systems 9 and 10 fixed to the housing of the sensor head 1.

Figure 2:
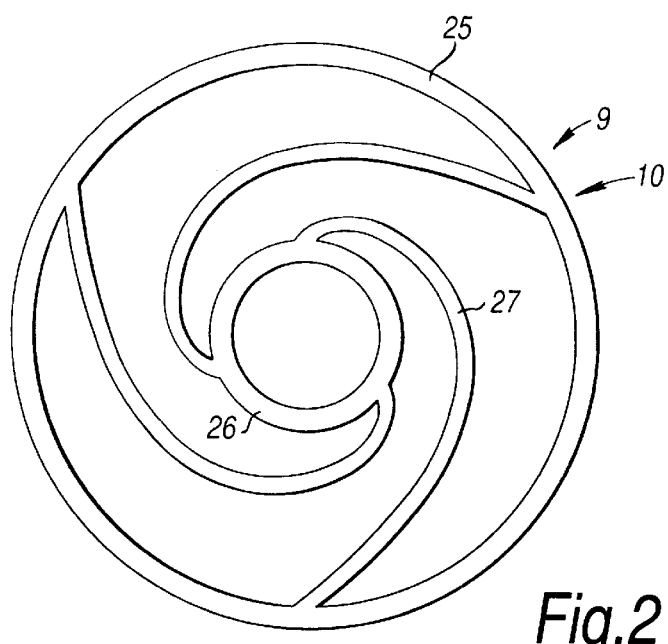
FIG. 2 shows a spring system used in the position measurement head of FIG. 1.

The spring systems 9 and 10 are identical and one is shown in FIG. 2. The spring system is cut from a single thin metal sheet. It has an outer ring 25 which is fixed to the housing 11 of the sensor head 1 and an inner ring 26 which is fixed to the mounting 8 for the movable lens 7. The outer and inner rings are connected by three spiral spring arms 27. That arrangement is very stiff in the plane of the springs but allows movement perpendicular to that plane.

The mounting 8 for the movable lens 7 has a conducting coil 12 mounted on it. The coil is located between pole pieces 13 and 14 of a magnet 15. The coil, and hence the movable lens 7 and its mounting 8, move in response to the current passed though the coil and, in equilibrium, take up a position where the force provided by the current passing through the coil is balanced by the force provided by the springs in response to the displacement of the mounting 8. For example, if the current passing through the coil provides a force tending to move the coil 12 and the mounting 8 downwards, they will move downwards bending the spring arms 27 progressively until the spring arms provide a balancing upwards force. The damping of this motion will be discussed below.

The path of the light from the laser to the focus detector is as follows. First the light from the laser 5 is collimated into a parallel beam by a collimating lens 16. The parallel beam is passed through a polarising beam splitter 17. In this embodiment a cube comprising two 45° prisms made by Melles-Girot (product no 03PBS052) is used. The light emitted by the laser has mostly one linear polarisation and the polarising beam splitter is set to pass that polarisation undeflected. The parallel beam next passes through the movable lens 7 which brings laser light to a first focus 18. That focus is taken as the object for relay lens systems 19 and 20 which bring the light from it to a second focus, the laser spot 21.

The position of the surface of the sample 2 relative to the table 3 is determined from the position of the second focus 21 relative to the upper surface of the table 3. That in turn is determined from the position of the measurement head 1 relative to the table 3 and the position of the second focus 21 relative to the position measurement head 1.

The position of the head 1 relative to the table is determined counting Moiré fringes produced by two gratings mounted at a small angle to each other, one of those gratings being fixed relative to the measurement head and the other being fixed relative to the table. Other scale systems may be used, however.

The position of the second focus below the sensor head 1 is affected by the position of the movable lens relative to the sensor head 1. As the movable lens 7 moves, for example, up the first focus 18 moves up by an identical amount because the beam between the collimating lens 16 and the movable lens 7 is parallel. Depending on the construction of the relay lens systems 19 and 20 the second focus 21 at the surface of the sample 2 will also move up either by the same or by a related amount. The position of the movable lens 7 relative to the measurement head 1 is measured by the movable lens position detector 23. The lens position detector is frictionless and adds minimum mass to the movable lens as described below. Any scaling or nonlinearity of the movement of the second focus 21 as a function of the movement of the movable lens 7 may be compensated for if desired.

As stated above, the position of the surface of the sample 2 is measured when the second focus 21 is on the surface of the sample 2. Positioning of the second focus 21 on the surface of the sample is achieved by moving the measurement head 1 with the mechanical drive and/or by moving the movable lens by varying the current through the coil 12, which may both be under the control of the electronic control circuit. That circuit operates in response to signals from the focus detector 6.

As is explained in more detail below, the lenses of the measurement head 1 produce an image of the plane at the second focus 21 that is normal to the optical path on a transducer 24 within the focus detector 6. Therefore if the second focus 21 is at a surface of the sample 2 then an image of that focus or laser spot on that surface will be formed on the transducer 24 of the focus detector 6.

If, however, the surface of the sample 2 is above or below the laser spot 21, the image formed on the transducer 24 of the focus detector 6 will be out of focus. The focus detector can detect whether the surface is above or below the second focus 21 as is explained hereinafter. The control circuit moves the mechanical drive and/or the movable lens accordingly.

In an alternative mode of operation the current through the coil 8 that moves the moving lens 7 is controlled so that the moving lens oscillates with an amplitude of a up to its full range of travel, which range depends on the application. This is normally much less than the full travel of the moving lens, and the focus detector is used to signal the moment in time when the focus is achieved. The control circuitry then measures the height of surface at that time and again may move the mechanical drive and the lens accordingly, which preferably is to keep the range of oscillation centred on the focus point but may also be to move the drives only when the focus point moves near to the end of the oscillation range. One advantage of the oscillating mode (others are mentioned below) is that a focus is definitely achieved twice per oscillation allowing a valid surface height measurement to be made. The other mode of operation disclosed above relies on the control circuitry being able to keep the system in focus within the surface height measurement error acceptable to make a valid measurement. In the oscillating mode the frequency of oscillation is preferably set to correspond with the desired spatial frequency of height measurement points as the spot scans across the sample being measured.

When the sample 2 is first mounted on the table 3 the surface will in general be a long way from the second focus 21. In such a condition the focus detector cannot discriminate between the sample surface being above or below the second focus. To achieve a focus the mechanical drive is raised up to a height where the second focus 21 must be above the sample surface. The measurement head 1 is then lowered with the mechanical drive until a focus is detected. While the lowering takes place the movable lens is held at a position in the middle of its travel.

The apparatus of FIG. 1 may be used to provide a series of surface position measurements across a sample surface by translating the table 3 transverse to the direction of the light emerging from the measurement head 1. A three dimensional map of the surface may be recorded if the table is moved so that the whole area is exposed to the light, for example in a raster pattern.

As the table moves, the height of the surface illuminated by the laser will in general change. The focus detector detects which way the second focus has to be moved to keep it on the surface. To move the second focus the control circuit moves the movable lens 7 in preference to the mechanical drive because the lens can be moved much more quickly. To maximise the speed of that movement the weight of the movable lens 7, its mounting 8 and the coil 12 is minimised, that assembly weighing only 4 g, for example. The mounting is made from a thin walled aluminium tube.

The movable lens may be moved rapidly enough to record the height at 1 $\mu$m lateral intervals to a resolution of 10 nm with the table moving at 30 mm s$^{-1}$. The movable lens has only, however, a vertical range of 2 mm. That is sufficient for profiling or measuring the flatness and surface roughness of many components, for example, packages for semiconductor device packages. Another application where the range of the movable lens is sufficient is measuring the depth of the scored groove around the removable tab in the ends, known as "converted ends", of beverage and food cans.

If a greater vertical range is required to profile a component, the control circuit may operate the mechanical drive when the movable lens approaches the end of its range. The mechanical drive may be displaced further than necessary with the movable lens moving back in the opposite direction in order to bring the movable lens back towards the centre of its range. To do so without losing the focus of the spot on the sample, the speed of the table may have to be reduced. Alternatively the table may be stopped and the mechanical drive moved a large distance before continuing with the scan moving just the movable lens. It may be necessary to knit together the sections of profiles so produced if the mechanical drive cannot be positioned with sufficient accuracy. The mechanical drive used in the present example could be positioned accurately to a resolution of 86 nm and so such knitting together was not necessary.

The operation of the focus detector is now disclosed in more detail.

The laser light falling on the surface of the sample 2 is reflected both specularly and by scattering. Some of the scattered light is collected by the relay lens system 20 and is returned to the polarising beam splitter 17. Specularly reflected light will also be collected if the surface is not at too shallow an angle to the incident light; collection of specularly reflected light may not occur if the surface of the sample is curved or is sloping. Scattering is an important mechanism where the surface is rough on the scale of the laser spot size, for example, where the sample is ceramic.

On the way to the sample the laser light passes through a quarter wave plate 22, located between the relay lens systems 19 and 20, which converts the linear polarisation of the laser light to a circular polarisation. The quarter wave plate used is not suitable to have an anti-reflection coating applied. To avoid reflections being returned to the polarising beam splitter 17 and then to the focus detector 6, the quarter wave plate is set at a small angle to the optical path.

Circularly polarised light contains light of both linear polarisations. This ensures that some materials that reflect one linear polarisation much more than the other will reflect at least some light.

On the return path, if the reflected light is circularly polarised it is converted to linearly polarised light. The reflected light that has that linear polarisation is reflected into the focus detector 6 by the polarising beam splitter 17.

Figure 3:
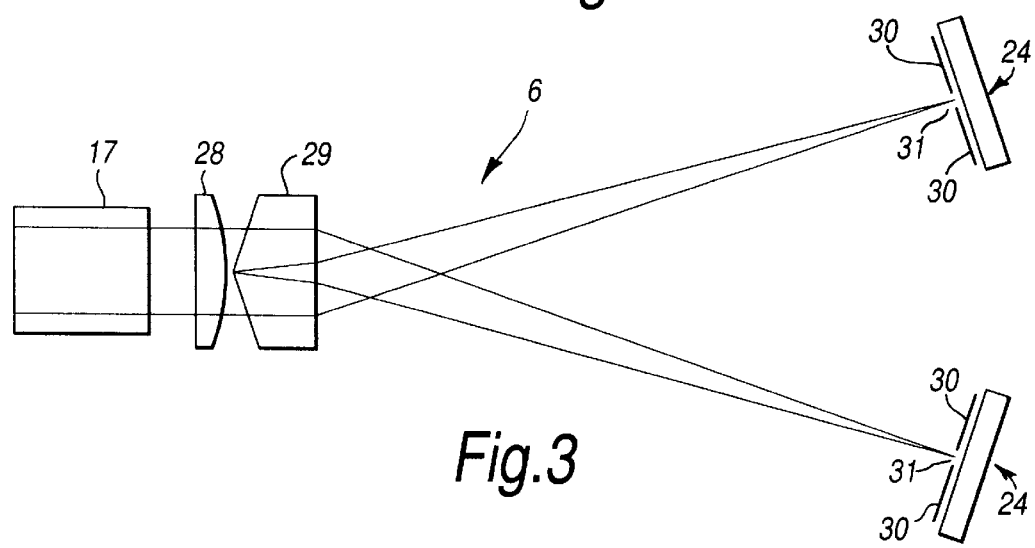
FIG. 3 shows the focus detector used in the position measurement head of FIG. 1.

FIG. 3 shows the focus detector 6 in plan. The light reflected into the focus detector by the polarising beam splitter 17 is a parallel beam which is incident on a converging lens 28 placed close to the beam splitter. The light leaving the lens 28 then passes through a prism 29 placed as close as possible to the lens 28 and arranged to refract the light leaving the right hand half of the converging lens to the left and to refract the light leaving the left hand half to the right (viewed in the direction of the beam). The beam is thus split into two beams each of which is brought to a focus on a separate transducer 24. (Either of the transducers 24 would be sufficient to detect whether the laser spot 21 is at the surface of the sample, but two are used to ensure that the measurement is made with as much light energy as possible.) Each of the two transducers comprises a matched pair of p-i-n diodes 30 separated by a gap 31 of only 10 $\mu$m, such as available from Matrox.

Figure 4:
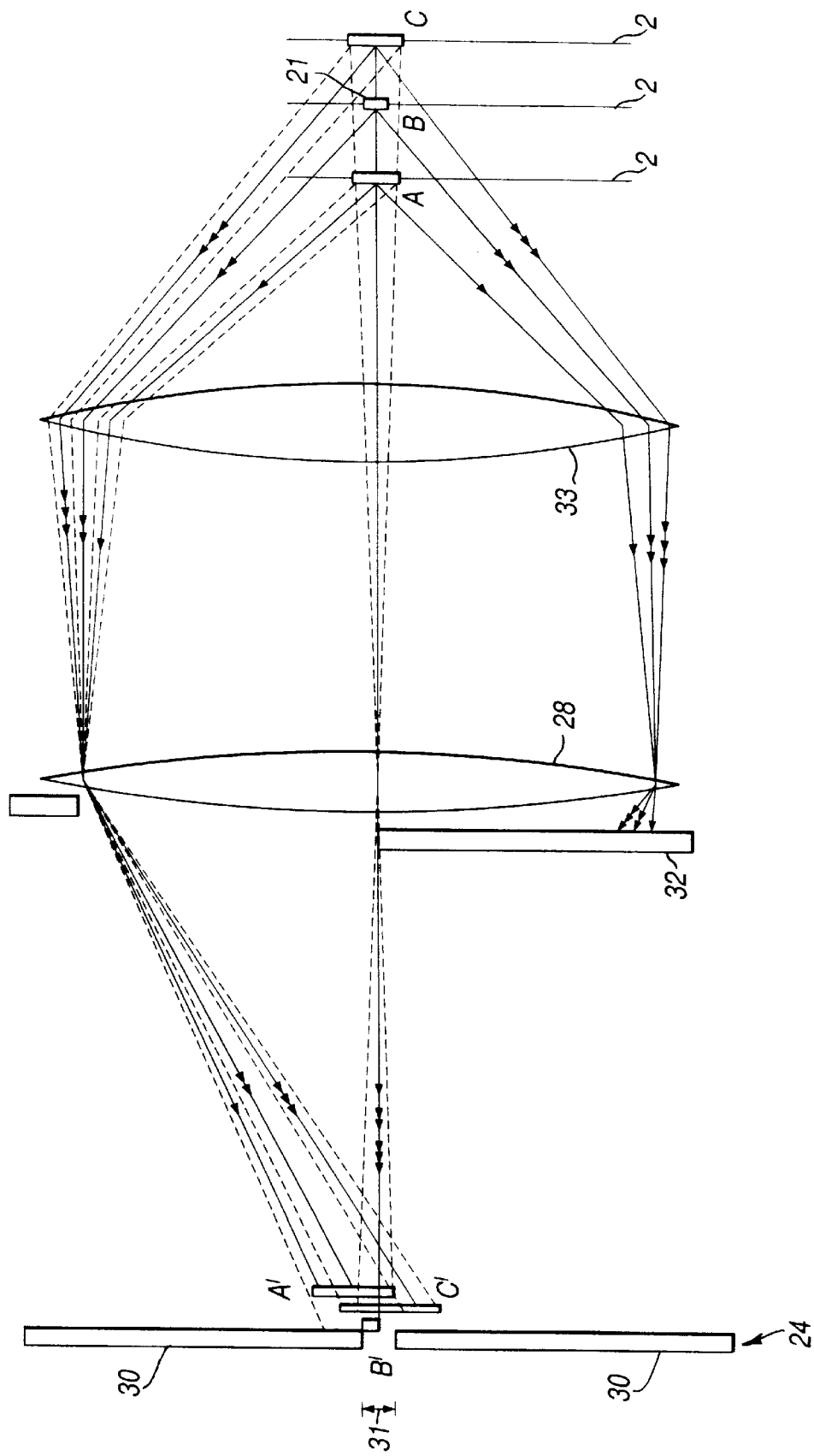
FIG. 4 illustrates the operation of the focus detector of FIG. 3.

FIG. 4 illustrates how a transducer 24 detects the position of the laser spot 21 relative to the sample surface. A simpler optical arrangement is shown in which there is no prism and only a single transducer 24. A stop 32 ensures that the transducer receives light from only one half of the lens 28. In the Figure, a single lens designated 33 is used to represent all the lenses in the measurement head 1 apart from converging lens 28. The sample 2 is shown in three positions. At position B the laser spot 21 is in focus and at positions A and C nearer and further from the measurement head respectively the laser spot is not focussed and is therefore larger. The rays from the centres of each of the laser spots A, B and C have been traced to the diodes 30. The optical system produces a focussed image of the spot B at B' in the gap between the two diodes. The centre of spot A is closer to the lens 33 than is B and so at the diodes the light from the centre of A has not yet been brought to a focus and so strikes the diodes over a larger area than that of B'. Because the light from A has not yet been brought to a focus by lens 28 the lower half of that larger area is removed by the stop 32 resulting in an illuminated area A' which falls mostly on the upper diode 30. Spot C is further from lens 33 than spot B and so the rays from the centre of spot C will be brought to a focus by lens 28 in front of the diodes 30; those rays then spread out to form a larger spot than spot B', but because those rays have come to a focus and have crossed over the effect of the stop 32 is to remove the upper half of that larger spot resulting in the spot C' which falls mostly on the lower diode 30. The spots A and C are, of course, larger than spot B. This results in further broadening of spots A' and C', as illustrated by the dotted rays, but that does not alter the result that A' falls mostly on the upper diode and C' falls mostly on the lower. The outputs of the two diodes 30 are summed algebraically with one output being given a negative sense to give a signal indicating whether the surface of the sample is above or below the focussed laser spot 21 (i.e the difference of the outputs is formed).

In the actual focus detector 6 shown in FIG. 3, the prism 29 performs the same function as the stop 32 in the arrangement of FIG. 4 in that it selects two geometrical halves of the light leaving the lens 28 and directs the light from each half respectively to one transducer 24. The outputs from the two transducers 24 are added together to make use of all the light energy available.

In some cases the sample may appear to scatter light from two points on its surface, for example if the laser spot is projected into a wall of a deep groove light will be scattered directly from that wall back to the focusing element system 20. Light may also, however, be scattered to the opposite wall of the groove and from there be scattered to the lens system 20. This may cause two spots to be imaged on the transducers 24 of the focus detector which may in turn cause the focus detector to signal falsely a loss of focus. To prevent that a stop 56 may be placed at the first focus 18, the stop having a small aperture to allow through only directly scattered rays.

Alternatively a stop may be placed in front of each of the transducers 24 with an aperture just large enough to allow through the in or out of focus spots A', B' and C' in FIG. 4) from directly scattered rays.

The use of a stop is particularly advantageous in the mode of operation disclosed above in which the position of the moving lens is set to oscillate. That is because the system needs only to detect the point at which focus is passed through, or a small range about that, and therefore the stop may be made as small as the focus, for example the focus 18, around which it is placed. This results in a high degree of exclusion of stray light whether from the environment of as the result of multiple scattering by the sample. The use of the stiff spring arrangement to support the moving lens described above is advantageous when a small aperture is used because it keeps the focus centred in the aperture.

The transducers 24 of the focus detector 6 described above have two light sensitive areas. As an alternative an array of light sensitive areas may be provided. With such an array the spot falling on the transducer may be tracked as it moves about the array focusing and defocusing. This, like the stop 56, helps to reject spots from indirect scattering of the laser spot 21 or spots produced by ambient light. Circuitry, preferably a suitable programmed digital circuit, is provided to perform the tracking.

Figure 5:
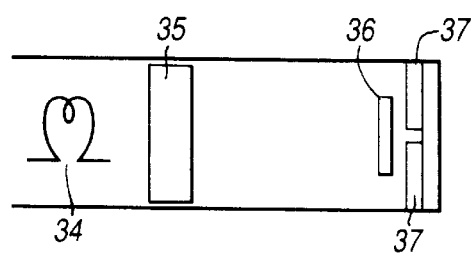
FIG. 5 shows the movable lens position detector used in the position measurement head of FIG. 1.

FIG. 5 shows a detail of the movable lens position detector 23.

Light from a source 34, diffused by a diffuser 35, illuminates a tab 36 (see FIG. 1 also) mounted on the mounting 8. The light casts the shadow of the tab on a pair of p-i-n diodes 36 separated by a gap. (This gap may, however, be much larger than that of the transducer in the focus detector 6.) As the mounting 8 for the movable lens moves up and down the tab moves with it, exposing more of the lower diode and less of the upper to the light and vice versa. The signals produced by the p-i-n diodes are algebraically summed with one signal being given a negative sense to obtain a signal indicative of the displacement of the tab 36 and hence of the movable lens 7 (i.e. the difference of the signals is formed). Suitable diodes are BPW34 p-i-n diodes made by Siemens or Telefunken.

Figure 6:
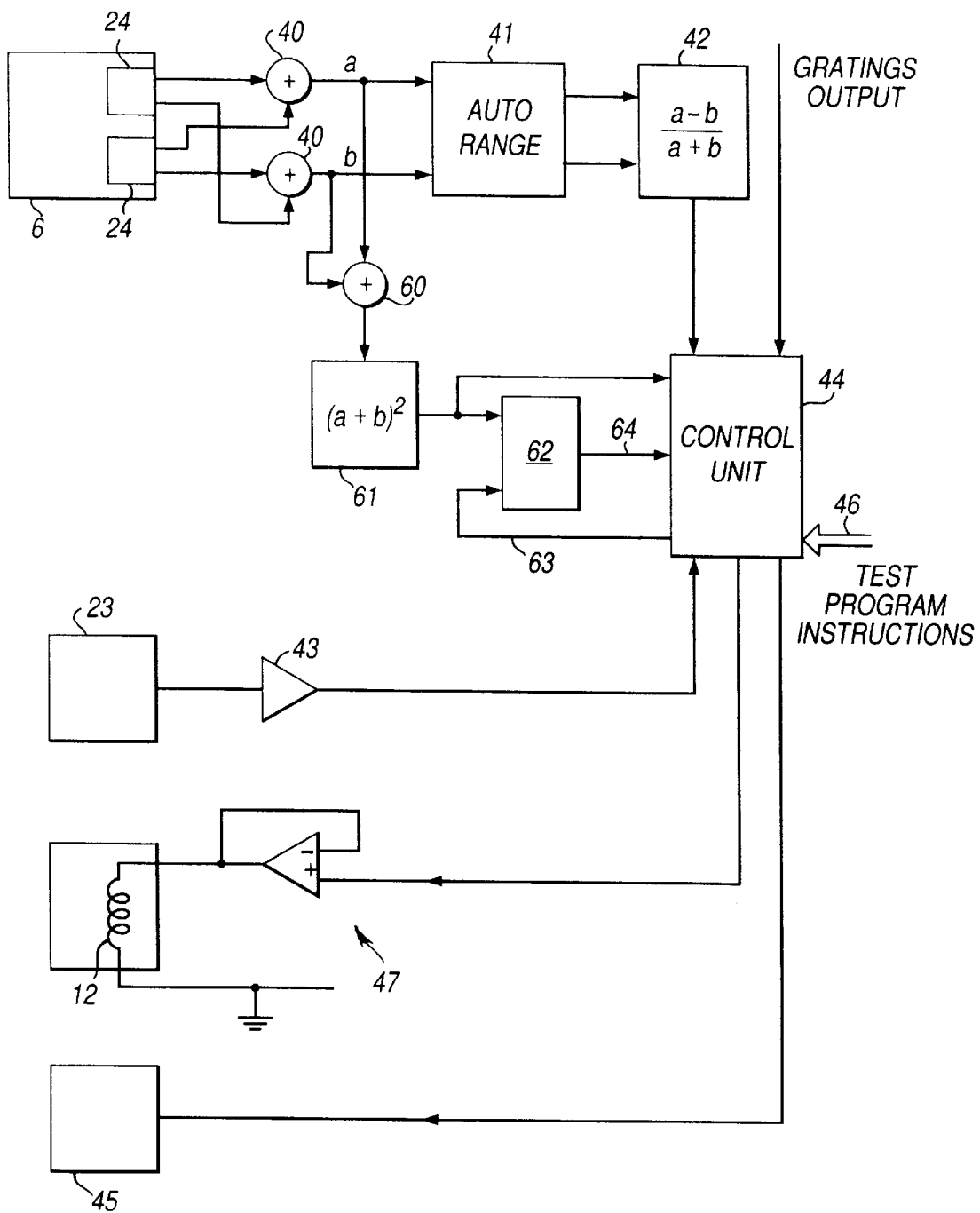
FIG. 6 shows part of the control circuit associated with the position measurement head of FIG. 1.

FIG. 6 is a block diagram of part of the control circuitry associated with the measurement head 1.

The signals from respective ones of the diodes of the transducers 24 of the focus detector are added together by respective adder circuits 40 to form signals a and b which are then amplified to a suitable level by an auto-range circuit 41. The difference of those signals divided by their sum is then formed by a circuit 42. The resulting signal indicates the distance of the surface of the sample 2 from the laser spot 21 and, as a result of the division, is independent of the amount of light scattered back to the measurement head 1 by the sample 2. That independence is important where the laser spot moves from, for example, a level specularly reflecting portion of the sample surface to a sloping section which only scatters. In such a transition the intensity of the light captured by the measurement head may drop by several orders of magnitude. An extreme but not unusual example of such a transition is that from a ceramic, which scatters weakly, to a gold layer deposited on the ceramic, which reflects strongly.

The output signal of the movable lens position detector 23 is amplified by an amplifier 43. The output of that amplifier and that of the circuit 42 are input to a control unit. The control unit 44 also receives an input from the gratings that detect the relative position of the measurement head 1 and the table 3.

On the basis of those sensor signals the control unit 44 outputs control signals for controlling current in the coil 12 that moves the movable lens and for controlling the movement of the mechanical drive, shown as a block in FIG. 6 at 45. In general the control unit 44 issues control signals that tend to bring the moving lens to a desired position from the actual position indicated by the movable lens position detector 23 and that tend to bring the measurement head to a desired position from that indicated by the gratings. What those desired positions are will depend on the measurement being made as indicated by the test program instruction signals 46 input to the control unit 44. If a scan of the heights of a surface is being measured then the desired positions of the moving lens and of the measurement head will be adjusted to tend to keep the laser spot 21 on the surface of the sample. As has been discussed above a choice may be made as to which or both of the desired positions for the measurement head and the movable lens is to be changed at any one time.

For the mode of operation disclosed above in which the position movable lens is set to oscillate about the focus position the desired position of the movable lens is, of course, varying with time and the control circuit operates to move the moving lens towards that desired but oscillating position. If during a scan the height of the sample changes so that the focus point occurs away from the centre of the oscillation then the control circuit will operate to move either the measurement head or the position of the movable lens within the head so as to return the focus point to the centre of the oscillation.

In a preferred embodiment the control unit 44 receives a further signal derived from the signals a and b. Signals a and b are added together by an adding circuit 60, the sum is then preferably squared by squaring circuit 61 and the signal is fed to a comparator circuit 62 which provides a high logic level to the control unit 44 if the analogue level output by the squaring circuit is above a threshold level on conductor 63 and a low logic level otherwise. The control unit uses the signal from the comparator 62 to determine whether the signal from the circuit 42 is valid or whether focus has been completely lost. Should that occur the control unit repeats the initial procedure for finding focus described above. The level on conductor 63 is set by the control unit either in accordance with an input by the operator or from measurements of the output of the squaring circuit 61 which are also fed to the control unit.

Figure 7:
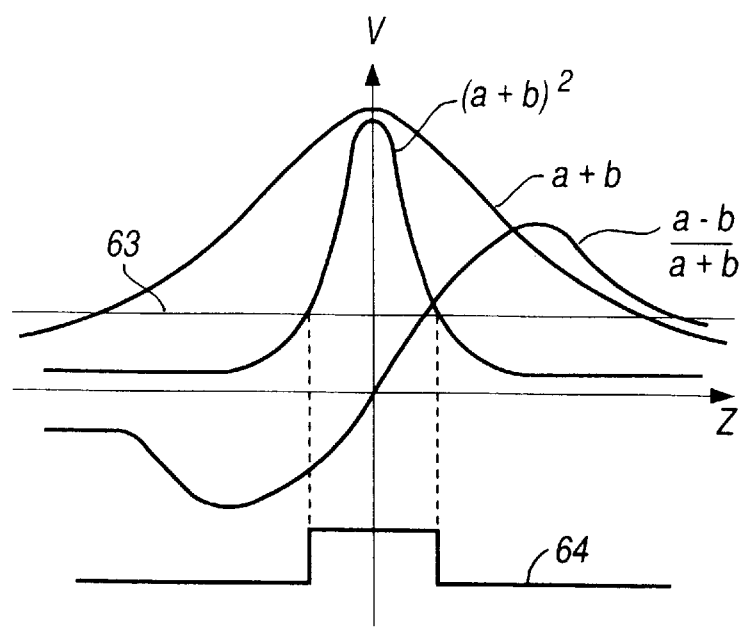
FIG. 7 is a plot of various signals derived from the outputs of the focus detector.

FIG. 7 illustrates the problem solved by the adder circuit 60, the squaring circuit 61 and the comparator 62. FIG. 7 is a plot of levels of the signals a+b and (a−b)/(a+b) experimentally determined against distance z from focus. The sum signal a+b is large near focus and drops towards zero away from focus. The (a−b)/(a+b) signal is zero at focus, varies linearly near zero, reaches maximal magnitude, respectively positive and negative on each side of focus, and then falls back towards zero. If the control unit used only the (a−b)/(a+b) signal to determine whether focus has been achieved it could falsely assume focus had been achieved at large distances from focus because there that signal is almost zero. That could occur both in the normal and oscillating modes of operation because the noise may cause the level of the signal to reach or cross zero. FIG. 7 also shows the output of the squaring circuit 61, the comparator 62 on conductor 64 and the threshold level 63. The output 64 of the comparator 62 is only a logic high near focus because $(a+b)^2$ is only above the threshold near focus. The validating signal produced by the comparator 62 therefore prevents the control circuit from falsely assuming that focus has been achieved. The comparator 62 is fed with $(a+b)^2$ rather than a+b because the former has a steeper sided and narrower peak and so produces a high level in a narrower window about the focus position thereby producing a more reliable triggering of the comparator.

The control signal for the coil 12 is fed as the input of a voltage follower 47 having low output impedance. This circuit sets the current through the coil (and hence the position of the movable lens) to a value of the voltage of the control signal divided by the resistance of the coil. If necessary a resistor may be wired in series with the coil to adjust the current for a particular control voltage. The low output impedance serves to damp the motion of the moving lens as the motion of a short circuited coil in a magnetic field is damped. The damping ensures rapid take up of a new position for the movable lens and also damps extraneous vibration.

The circuit shown in FIG. 6 may be implemented as an analogue circuit, but the parts performing calculations may perform digitally. The test program instructions are provided by a suitably programmed computer.

Figure 8:
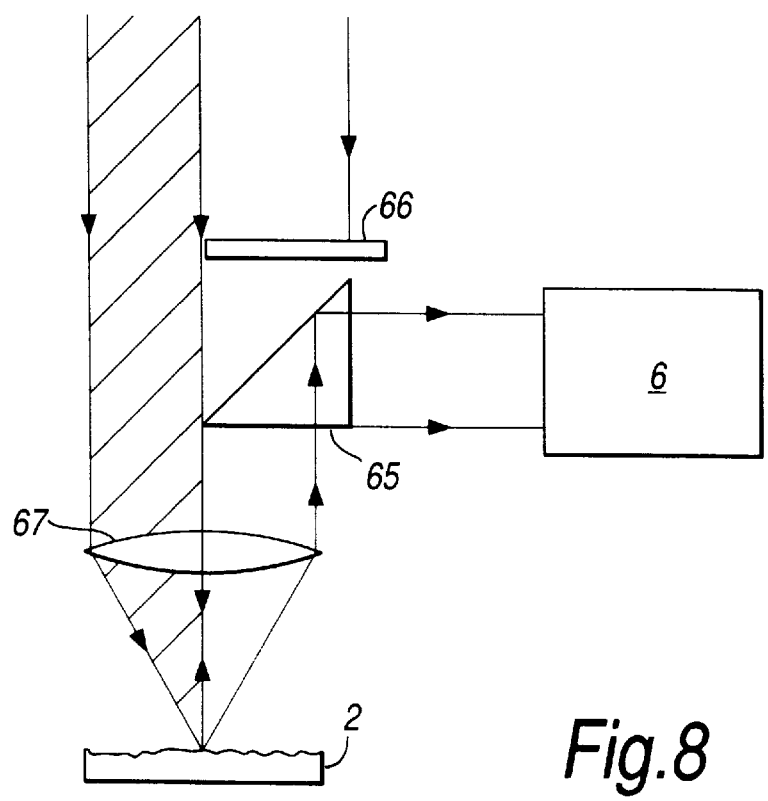
FIG. 8 illustrates an alternative optical arrangement to that of FIG. 1.

In the optical arrangement of FIG. 1 the beam splitter 17 reflects about 2% of the light from the laser 5 directly into the focus detector 6. The path that this light mostly takes is to be reflected from the 45° interface inside the beam splitter in the direction away from the focus detector. It is then reflected from the outer surface of the beam splitter back towards the focus detector this time crossing the interface and the opposite outer surface. That light is not light reflected from the sample, and accordingly the signal to noise ratio of the focus detector 6 is reduced. An alternative embodiment is shown in FIG. 8 which for the purpose of illustration shows only a replacement for the beam splitter 17, namely a prism 65, a stop 66, a lens 67 representing the movable lens 7 and the relay lens systems 19 and 20, the sample 2, and the focus detector 6. In this arrangement the paths of the light to and from the sample are separated although the light passes through the same lenses on the paths towards and back from the sample 2. A stop 66 is arranged so that only half the lens 67 is illuminated by light from the laser 5 and that light produces a spot on the sample 2 but only approaches the spot from one side of a plane passing through the optic axis. The region having light travelling towards the sample is hatched in FIG. 8. In the full arrangement of lenses of FIG. 1 that light passes only through one half of each lens, although the light occupies the other side of the plane when it passes through an intermediate focus. All the specularly reflected light and about half of the scattered light is collected by the other half of the lens 67. The light leaving that half of the lens 67 is reflected into the focus detector 6 by the prism 65, which may be replaced by a mirror. The prism 67 is shielded from the light coming directly from the laser by the stop 66 preventing light from the laser being deflected into the focus detector through multiple reflections in the prism 65.

In the position measurement head of FIG. 1 the movable lens 7 is mounted so that it moves vertically. Since most of the vibration picked up from the floor on which the instrument stands is in a vertical direction, the movable lens 7 and its mounting 8 may vibrate vertically and reduce resolution. In an alternative embodiment, not shown, the movable lens and its mounting may be arranged so that they move horizontally, by deflecting the optical path through the measurement head through 90° at a convenient point with a mirror.

The relay lens system 21 may be replaced with others of different magnification by means of a revolving turret 57. At one of the revolving turret positions there may be, instead of a lens, a touch trigger probe, which comprises a thin arm with a ruby ball mounted on its end. This can also be used to measure the position of the surface of a sample by advancing the mechanical drive until the ruby ball touches the sample. When the ruby ball touches the sample the arm operates a switch and the position of the surface is recorded.

The mechanical drives for the table 3 also have control circuits and these and the circuit of FIG. 6 receive test program instructions from a computer programmed to perform the measurement tests of the samples desired. The computer, for example, stores the paths to be scanned over the surface of the component to be tested; it also computes the heights of the sample surface from the outputs of the movable mirror position detector and the gratings associated with the vertical mechanical drive and records those heights for analysis.

As an alternative to the table 3 a component may be mounted in a drive that not only provides horizontal translation but will also rotate the component. As the laser spot is scanned along the component the curvature of the surface may be calculated and the component rotated to keep the reflection of the light specular. With a rotatable mount the whole three dimensional surface may be profiled or the shapes of selected portions though the component could be determined.

The optical surface position measuring system described above may be integrated with other optical sensors, for example as follows. In FIG. 1 a filter plate 50 is inserted in the optical path between the relay lens systems 19 and 20 at an angle. The filter plate transmits most of the laser light incident in both directions. (The laser preferably used operates at wavelength of 780 nm, just in the infra-red.) The filter plate reflects nearly all of the light incident on it having a wavelength of less than 700 nm and so reflects most of the visible light collected by the relay lens system 20. That visible light is reflected into other detectors, for example, a camera 51 and an edge detector 52 by half-silvered mirrors 53 and 54. Illumination for the camera is provided by the source 55, the light from which passes through the half silvered mirrors and the relay lens 20. Pictures from the camera may be sampled into the computer where, for example, the areas of certain features may be calculated. This arrangement also allows the surface position measurements made with the laser light to be correlated with features seen in the camera because a small proportion of the laser light is reflected by the filter plate 50 and the camera is sensitive to that light also.

The measurement head 1 will bring the laser spot 21 to a focus on a surface below a transparent coating or even on an interface between two transparent materials. The latter ability is of use if it is desired to image the interface with the camera. It is difficult to focus an ordinary camera on the interface between two transparent materials, but the position measurement head 1 brings the camera 51 automatically to be focused on such an interface.

The edge detector operates on collimated light supplied from under the table and signals when an edge is passed as the table moves along; it is particularly useful for measuring the widths of repeated components, for example, the legs of a lead frame for a semiconductor device.

Further, it is within the scope of the invention to employ in combination the preferred features hereinbefore described to the extent that such features are not mutually exclusive and, more especially, a combination of any two or more features recited in the dependent claims. The invention further provides any new feature hereinbefore described or any new combination of hereinbefore described features.

What is claimed is:

1. An apparatus for measuring the position of a point on the surface of a sample comprising,
   means for producing a spot of light to illuminate said point on the surface of the sample,
   a focus detector,
   a measurement head comprising a movable focusing element arranged to project onto the focus detector an image of a plane beyond the measurement head in the region of the sample surface,
   a measurement head drive constructed and arranged to translate the measurement head, so as to vary a distance between the movable focusing element and the plane imaged on the focus detector,
   a movable focusing element drive constructed and arranged to move the movable focusing element relative to the measurement head so as to vary a focal length of the measurement head,
   a controller responsive to the focus detector which operates the measurement head drive and movable focusing element drive such that an image of the illuminated point on the sample surface is kept in focus, or in a desired state of defocus, on the focus detector by simultaneously adjusting the focal length and the distance between the movable focusing element and the plane imaged on the focus detector.

2. An apparatus as claimed in claim 1, wherein the measurement head drive is arranged to move the focus element system mechanically and the movable focusing element drive is arranged to move the movable focusing element electromagnetically.

3. An apparatus as claimed in claim 2 wherein the movable focusing element drive comprises a coil for producing a field for moving the movable focusing element and a driver circuit having a low output impedance.

4. An apparatus as claimed in claim 1, wherein the controller is arranged to operate the movable focusing element drive in preference to the measurement head drive to achieve focus.

5. An apparatus as claimed in claim 4, wherein the controller is arranged to operate the measurement head drive when the movable focus element drive approaches the end of its range.

6. An apparatus as claimed in claim 5, wherein the controller is arranged to operate, when the movable focus element drive approaches the end of its range, the measurement head drive further than is necessary to achieve focus and to operate the movable focusing element drive so that it moves back towards the centre of its range.

7. An apparatus as claimed in claim 1, wherein the movable focusing element is mounted on at least one spring system, each spring system comprising a plurality of arms arranged generally in a plane perpendicular to the axis of movement of the movable focusing element which support the movable focusing element, the arms being other than radial to the axis of movement.

8. An apparatus as claimed in claim 7, wherein the said arms are spiral.

9. An apparatus as claimed in claim 1, wherein the controller is arranged, in response to the focus detector indicating that the apparatus is a long way from focus, to fix relative to the measurement head the position of the movable focusing element and to move the measurement head using the measurement head drive towards the sample from a predetermined point until focus is achieved, having first withdrawn the focus element system if it is closer to the sample than the predetermined point.

10. An apparatus as claimed in claim 1 comprising a displacement sensor comprising,
    a tab of opaque material for mounting on the movable focusing element or on a co-moving support,
    a source of diffuse light placed to one side of the tab, and
    a transducer so placed that the source casts a shadow of the tab on the transducer,
    wherein the transducer has first and second separate light sensitive areas so placed that the shadow progressively covers more of the first area and less of the second as the tab moves in one direction.

11. An apparatus as claimed in claim 1, wherein the means for producing the spot of light on the surface of the sample is arranged to project that spot through the focusing element system, and wherein the source of light for that is polarised and the apparatus includes a polarising beam splitter arranged to allow a major portion of the light to pass through undeflected on its way to the sample and to deflect light returning form the sample into the focus detector.

12. An apparatus as claimed in claim 1, wherein the means for producing a spot of light comprises a linearly polarised source of light and the apparatus comprises a quarter wave plate though which the light passes on its way from the source to the spot.

13. An apparatus as claimed in claim 1, comprising an aperture set in front of the focus detector or around a focus lying between the spot on the sample and the focus detector.

14. An apparatus as claimed in claim 1 having mounting means for translating and rotating a sample wherein the control means is arranged to measure the shape or form of the sample.

15. An apparatus as claimed in claim 14 wherein the control means is arranged to operate the mounting means to maintain the orientation of the sample such that the light from the means for producing the spot that is specularly reflected by the sample is received by the focus detector.

16. An apparatus as claimed in claim 1 comprising means for moving the spot across the sample and wherein the control means is arranged oscillate the movable focusing element in a range generally centered about the point of focus as the spot moves across the sample.

17. An apparatus as claimed in claim 1 comprising means for moving the spot across the sample and wherein the control means is arranged to move the centre of the oscillation of the movable focusing element when the focus point approaches the end of the range of the oscillation.

18. An apparatus as claimed in claim 1 comprising means for moving the spot across the sample and wherein the control means is arranged to control the frequency of oscillation to correspond to the desired spatial frequency of measurement points across the sample, or to a multiple thereof.

19. An apparatus as claimed in claim 1, comprising an aperture set in front of the focus detector or around a focus lying between the spot on the sample and the focus detector.

20. An apparatus as claimed in claim 1,
   wherein the means for producing said spot of light projects said spot through the measurement head, and wherein the apparatus is arranged such that light passing through the measurement head on its way to producing the said spot is deflected by a first element of the measurement head and that said focus detector receives light from said sample that has been deflected by a second element of the measurement head.

21. An apparatus as claimed in claim 20 comprising a prism positioned so as to deflect the light deflected by said second portions into the focus detector and so as not to be struck by light on its way to said spot.

* * * * *